3,426,085
PROCESS FOR THE MANUFACTURE OF
ETHYLENE CHLOROHYDRIN
Günther Mau and Lothar Hörnig, Frankfurt am Main,
Germany, assignors to Farbwerke Hoechst Aktiengesellschaft vormals Meister Lucius & Bruning, Frankfurt am Main, Germany, a corporation of Germany
No Drawing. Filed Dec. 1, 1966, Ser. No. 598,218
Claims priority, application Germany, Dec. 24, 1965,
F 47,997
U.S. Cl. 260—634     6 Claims
Int. Cl. C07c 29/04

ABSTRACT OF THE DISCLOSURE

A process has been provided for producing ethylene chlorohydrin which comprises reacting, at a temperature from about 50° C. to about 300° C. and a pressure from about 1 to about 50 atmospheres,, ethylene, oxygen, and hydrogen chloride, in the presence of water, the molar ratio of ethylene to oxygen being from 2:1 to 20:1, and water to ethylene greater than 1:1, said reaction being carried out in the presence of a tellurium catalyst selected from the group consisting of elementary tellurium, tellurium dioxide, tellurium tetrachloride, telluric acid, alkali metal tellurites, alkali metal tellurates, tellurium sulfate, and tellurium nitrate, and recovering ethylene chlorohydrin. The process can be carried out in an aqueous phase as well as in a gaseous phase. If carried out in an aqueous phase, the concentration of hydrogen chloride in the aqueous catalyst solution is from 10% to 35% by weight. Further, gaseous hydrogen chloride may also be used in the aqueous process. When the process is carried out in a gaseous phase, the tellurium catalyst is deposited on a solid carrier and water is used in the form of steam. In another novel aspect of this invention, the ethylene may first be reacted with the catalyst solution and then the catalyst solution is reoxidized with oxygen in a separate reaction vessel.

---

The present invention relates to a process for the manufacture of ethylene chlorohydrin, wherein ethylene, oxygen and hydrogen chloride are reacted in the presence of water in the liquid or gaseous phase using catalysts containing tellurium and/or tellurium compounds.

Ethylene chlorohydrin is produced on an industrial scale from ethylene and hypochlorous acid. It constitutes an intermediate product in the production of glycol obtained either by alkaline saponification of ethylene chlorohydrin or by separation of hydrogen chloride with formation of ethylene oxide and subsequent hydration of the latter. In this latter process ethylene oxide may be considered a derivative of ethylene chlorohydrin. Presently, ethylene oxide is frequently produced by direct oxidation of ethylene in the presence of silver catalysts. Besides the further working up of ethylene oxide to glycol, the addition of hydrogen chloride to ethylene oxide with formation of ethylene chlorohydrin is industrially important so that in this case ethylene chlorohydrin can inversely be considered a derivative of ethylene oxide.

The direct oxidation of ethylene to ethylene oxide has not been able to supersede completely the older process of the addition of hypochlorous acid to ethylene, although in the older process for each mol of ethylene chlorohydrin one mol of elementary chlorine must be used and one mol of hydrogen chloride and in the further working up of the ethylene chlorohydrin an additional mol of hydrogen chloride or the equivalent amount of chloride are necessarily obtained. The drawback of the direct oxidation process is that the yield of ethylene oxide, calculated on the ethylene used, amounts to only about 50–60%, whereas in the process of addition of hypochlorous acid to ethylene considerably better yields are obtained.

The present invention provides a process for the manufacture of ethylene chlorohydrin, which comprises reacting ethylene, oxygen and hydrogen chloride in the presence of water in the liquid or gaseous phase using a catalyst containing tellurium and/or tellurium compounds.

Working in the liquid phase is preferred in many cases. Solutions of readily accessible tellurium compounds are then used, for example tellurium dioxide, tellurium tetrachloride or telluric acid. It is also possible to use solutions of alkali metal tellurites or tellurates, tellurium sulfate or tellurium nitrate. As solvent aqueous hydrochloric acid is preferred. It may also be used in admixture with organic solvents, advantageously organic solvents miscible with water, for example ethanol, glycol and other alcohols. To reduce the solubility of the reaction products, especially of ethylene chlorohydrin, the catalyst solution may contain dissolved salts, for example alkali metal chlorides.

To perform the reaction of ethylene and oxygen in the catalyst solution a mixture of both gases can be used. Alternatively, the ethylene can be first reacted with the catalyst solution, whereby the tellurium compound contained in the catalyst solution is reduced to elementary tellurium, oxygen can then be introduced into the solution to re-oxidize the elementary tellurium. In either case hydrogen chloride and water are added to the system in the same measure as they are consumed, suitably in the form of aqueous hydrochloric acid.

More particularly, the process of the invention is carried out as follows: ethylene and oxygen are blown into a reactor filled with catalyst solution containing water and hydrogen chloride. As reactor a vessel with stirrer, a bubble column, a flow tube, a scrubbing tower or an airlift pump may be used. It is expedient to adjust temperature and pressure to such a value that the ethylene chlorohydrin formed can escape as vapor. When the process is carried out at atmospheric pressure, a reaction temperature of about 95 to 100° C. is suitable. It is likewise possible, however, to first leave the ethylene chlorohydrin in the reaction solution and to remove it in another place by distilling the total amount or part of the reaction solution.

Ethylene and oxygen can be introduced separately from one another as regards time and place. In the latter case a system of two series-connected reactors can be used through which the catalyst is conducted. A preferred embodiment consists in that ethylene is first reacted with the catalyst solution and the catalyst is then re-oxidized with oxygen either subsequently or in a separate vessel.

The tellurium content of the catalyst solution in the form of tellurium compounds is suitably in the range of from 10 to 200 grams of tellurium per liter of catalyst solution. It is likewise possible, however, to operate with a solution having a concentration of 1 gram of tellurium per liter. With higher concentrations of tellurium, for example, 500 grams per liter of solution the process can also be carried out with advantage, especially when ethylene and oxygen are reacted with the catalyst separately with regard to time or space, that is to say one after the other.

The reaction is suitably carried out at a temperature in the range of from 50 to 250° C. With temperatures above 100° C. it is generally necessary to operate under pressure. As already mentioned, it is expedient to operate at a temperature a little below the boiling point of the fresh catalyst solution. The pressure applied is consequently in the range of from 1 to 50 and preferably 1 to 20 atmospheres.

In general, the conversion increases with the temperature, the pressure and the concentration of tellurium in the catalyst solution. It is not expedient, however, to operate at too high a temperature since in this case increasing amounts of by-products are formed.

The concentration of hydrogen chloride in the aqueous catalyst solution is critical. It is advantageously in the range of from 10 to 35% by weight. With lower concentrations lower conversions are obtained whereas higher concentrations involve lower yields. In the latter case increasing amounts of chlorinated hydrocarbons are formed.

The water content of the catalyst solution is preferably in the range of from 30 to 90 and more preferably 40 to 80% by weight. The concentrations of hydrogen chloride and water in the catalyst solution change owing to consumption and discharged material, if any, and therefore, the two components are replenished either continuously or discontinuously.

The starting components ethylene and oxygen can be used in admixture with inert gases, for example, ethane, methane, nitrogen, noble gases, methyl chloride, carbon dioxide and the like. The oxygen is preferably used in the form of air.

In many cases, the conversion of the components used is not quantitative. After separation of the reaction products the unreacted portions are therefore reconducted wholly or partly into the reaction zone. When ethylene and oxygen are used simultaneously in one reactor, the mixing ratio of the gases is not optional owing to the danger of explosion. It is, therefore, expedient that starting mixtures or recycle mixtures contain an excess of ethylene. The molar ratio of ethylene to oxygen at the reactor inlet should preferably be in the range of from 2:1 to 20:1. If gaseous hydrogen chloride is used besides aqueous hydrochloric acid, the molar ratio of ethylene to gaseous hydrogen chloride is advantageously from 0.5 to 1 to 10:1.

The principal reaction product ethylene chlorohydrin, which forms with water a mixture having a constant boiling point, is generally removed from the catalyst solution in the form of the azeotrope. After having been condensed, the aforesaid mixture is worked up in usual manner. If the condensable portions of the vapor discharged from the catalyst solution contain a higher amount of water than corresponds to the composition of the azeotrope, the condensate can be subjected to a distillation in order to obtain the azeotrope. Discharged hydrochloric acid can be reconducted into the reactor, suitably after separation of the ethylene chlorohydrin or the azeotrope consisting of ethylene chlorohydrin and water.

By-products formed in the process of the invention are ethanol, ethyl chloride and glycol. Ethanol and ethyl chloride are suitably reconducted into the reactor because by this step the further formation of these substances in the reactor can be reduced. Glycol generally remains in the catalyst solution. After a glycol content of several percent by weight has been attained, glycol is no longer formed or the amount formed diminishes.

The process according to the invention not only can be performed in catalyst solutions, as hereinbefore described, but also in the presence of solid catalysts, especially catalysts supported on carriers, that is to say in the gaseous phase. In this mode of execution either fixed or moved catalysts are used. To prepare the catalysts, readily accessible tellurium compounds are suitably used, for example, tellurium dioxide, tellurium tetrachloride, telluric acid, tellurites, tellurates, or tellurium sulfate. Tellurium metal may also be used. Suitable carrier materials are, for example, silicic acid and silica gel, aluminum oxide, aluminum silicate, or coal. The tellurium and/or tellurium compounds are applied to the carrier material in known manner, in the simplest case by impregnating it with a solution of a tellurium compound, for example, an acid solution of tellurium dioxide, and subsequently drying, if desired.

More particularly, the process is carried out in the gaseous phase as follows: a gas mixture containing ethylene, oxygen, hydrogen chloride and steam is passed through a reactor filled with the catalyst. The reactor may be designed as a shaft reactor, a bundle of tubes, a fluidized bed or a gas lift. The issuing gas mixture is cooled at the end of the reactor and condensed, suitably in stages. In addition to water, ethylene chlorohydrin is obtained which is worked up as described above. Unreacted starting components are suitably reconducted into the reactor. The by-products ethanol and ethyl chloride, mentioned with the process in the liquid phase, as well as aqueous hydrochloric acid may also be recycled into the reaction zone.

The starting components can be introduced separately into the reactor. The reactor may also be provided with several inlets for one or several reactants, respectively. The starting components may contain the inert gases specified above. It is particularly advantageous to use oxygen in the form of air and hydrogen chloride in the form of vapors of aqueous hydrochloric acid.

The concentration of tellurium in elementary or bound form in the solid catalyst varies advantageously between 0.1 and 50% by weight, more advantageously 0.5 and 30% by weight. It is likewise possible, however, to use catalysts containing more than 50% by weight of tellurium, in special cases up to 100% by weight, namely when pure elementary tellurium is used as catalyst.

In view of the danger of explosion of ethylene/oxygen mixtures it is expedient to operate with a feedstock and/or recycle gas mixture containing an excess of ethylene. The molar ratio of ethylene to oxygen is advantageously in the range of from 2:1 to 20:1. The molar ratio of steam to hydrogen chloride is, in general, above 2:1, advantageously above 3:1, but not higher than 25:1.

In order to obtain a good yield of ethylene chlorohydrin, it is suitable to select at the beginning of the reaction a molar ratio of water to ethylene greater than 1:1.

The process of the invention is preferably carried out under a pressure from 1 to 50, more preferably 1 to 20 atmospheres. The temperature applied suitably ranges from 100 to 300° C.

As compared with the old process of the addition of hypochlorous acid an ethylene, the process for the manufacture of ethylene chlorohydrin according to the invention, which can be used as first stage for the manufacture of ethylene oxide and glycol, offers the advantage that no elementary chlorine is required and that no hydrogen chloride, hydrochloric acid or inorganic chlorides are obtained, on the contrary, hydrogen chloride and/or aqueous hydrochloric acid are used as chlorine suppliers.

The process according to the invention advantageously differs from the process of the direct oxidation of ethylene to ethylene oxide with the further treatment of the latter to ethylene chlorohydrin in that ethylene chlorohydrin is produced in one reaction stage. When, however, ethylene chlorohydrin is considered an intermediary product for the manufacture of ethylene oxide, two reaction stages are required, but the yield of over 90% of ethylene chlorohydrin, calculated on the ethylene used, constitutes a distinct progress in comparison with the considerably lower yield of the direct oxidation to ethylene oxide.

The following example serves to illustrate the invention but it is not intended to limit it thereto.

EXAMPLE 80 grams of tellurium dioxide (0.625 mol) were dissolved in 1 kilogram of aqueous hydrochloric acid (20% by weight of hydrogen chloride). In a round flask provided with gas inlet tube, reflux condenser and stirrer the solution was heated at 100° C. by external heating. Ethylene was then introduced, whereby elementary tellurium was precipitated. After having supplied 90 liters of ethylene (measured under normal conditions of pressure and temperature), the experiment was interrupted and the solution was filtered. The filter residue consisted of pure tellurium (41.1 grams=0.337 mol). The tellurium was added again to the solution and the mixture was reintroduced into the flask.

After having replaced the reflux condenser with a distillation bridge, the solution was heated again to 100° C. 332 milliliters of distillate were removed and distilled over a laboratory column. 59 grams of the azeotropic mixture of ethylene chlorohydrin and water containing 42% by weight of ethylene chlorohydrin (corresponding to 24.8 grams or 0.308 mol) were obtained. The distillation residue, which consisted of dilute aqueous hydrochloric acid, was returned to the distillation flask.

After re-installation of the reflux condenser to the reaction apparatus, oxygen was introduced into the reaction solution which was vigorously stirred to whirl up the tellurium. After having passed through 26 liters of oxygen (measured under normal conditions of pressure and temperature), the elementary tellurium had dissolved. To replenish the loss of water contained in the azeotrope, and of hydrogen chloride consumed for the preparation of the chlorohydrin, 50 grams of aqueous hydrochloric acid of 22% strength by weight were added to the solution.

The re-oxidized catalyst solution was analyzed and a content of 1 gram of ethylene glycol (0.016 mol) was found. The analysis of the off-gases during the introduction of ethylene, the concentration of the catalyst solution and the distillation of the azeotrope indicated the formation of 0.01 mol of ethanol, 0.005 mol of ethyl chloride and 0.010 mol of carbon dioxide. The yield of ethylene chlorohydrin amounted to 0.308 mol/0.344 mol=89.5%.

What is claimed is:

1. A process for producing ethylene chlorohydrin which comprises reacting, at a temperature from about 50° C. to about 300° C. and a pressure from about 1 to about 50 atmospheres, ethylene, oxygen, and hydrogen chloride, in the presence of water, the molar ratio of ethylene to oxygen being from 2:1 to 20:1, and water to ethylene greater than 1:1, said reaction being carried out in the presence of a tellurium catalyst selected from the group consisting of elementary tellurium, tellurium dioxide, tellurium tetrachloride, telluric acid, alkali metal tellurites, alkali metal tellurates, tellurium sulfate, and tellurim nitrate, and recovering ethylene chlorohydrin.

2. The process according to claim 1 wherein the reaction is carried out at a temperature from 50 to 250° C. in an aqueous catalyst solution having from 30% to 90% by weight of water, at a tellurim catalyst concentration from 1 to 500 grams of tellurium per liter of the catalyst solution, and at a concentration of hydrogen chloride in the aqueous catalyst solution from 10 to 35% by weight.

3. The process according to claim 2 wherein the reaction is carried out additionally in the presence of gaseous hydrogen chloride at a molar ratio of ethylene to gaseous hydrogen chloride from 0.5 to 1 to 10:1.

4. The process according to claim 1 wherein the reaction is carried out at a temperature from 100° C. to 300° C. in a gaseous phase, the tellurium catalyst being deposited on a solid carrier in the range from 0.1 to 100% by weight and wherein water in form of steam is used in a molar ratio of steam to hydrogen chloride from above 2:1 to 25:1.

5. The process according to claim 4 wherein the tellurium catalyst is supported on silicic acid, silica gel, aluminum oxide, aluminum silicate, or coal.

6. The process according to claim 2 wherein ethylene is first reacted with the catalyst solution and the catalyst is re-oxidized with oxygen in a separate reaction vessel.

References Cited

UNITED STATES PATENTS

| 2,378,104 | 6/1945 | Reed | 260—634 |
| 2,428,590 | 10/1947 | Shokal et al. | 260—632 |

FOREIGN PATENTS 626,669  6/1963  Belgium.

LEON ZITVER, *Primary Examiner.*

H. T. MARS, *Assistant Examiner.*